United States Patent
Zhang et al.

(10) Patent No.: US 7,774,340 B2
(45) Date of Patent: Aug. 10, 2010

(54) METHOD AND SYSTEM FOR CALCULATING DOCUMENT IMPORTANCE USING DOCUMENT CLASSIFICATIONS

(75) Inventors: Benyu Zhang, Beijing (CN); Hua-Jun Zeng, Beijing (CN); Wei-Ying Ma, Beijing (CN); Zheng Chen, Beijing (CN)

(73) Assignee: Microsoft Corporation, Redmond, WA (US)

( * ) Notice: Subject to any disclaimer, the term of this patent is extended or adjusted under 35 U.S.C. 154(b) by 559 days.

(21) Appl. No.: 10/881,812

(22) Filed: Jun. 30, 2004

(65) Prior Publication Data

US 2006/0004809 A1 Jan. 5, 2006

(51) Int. Cl.
G06F 17/30 (2006.01)
(52) U.S. Cl. ..................................................... 707/726
(58) Field of Classification Search .................. 707/726
See application file for complete search history.

(56) References Cited

U.S. PATENT DOCUMENTS

| | | | |
|---|---|---|---|
| 6,370,526 B1* | 4/2002 | Agrawal et al. | 707/5 |
| 6,389,436 B1* | 5/2002 | Chakrabarti et al. | 715/513 |
| 6,654,742 B1 | 11/2003 | Kobayashi et al. | |
| 6,738,678 B1* | 5/2004 | Bharat et al. | 700/48 |
| 7,305,610 B1* | 12/2007 | Dean et al. | 715/205 |
| 2004/0128282 A1* | 7/2004 | Kleinberger et al. | 707/3 |
| 2005/0060297 A1* | 3/2005 | Najork | 707/3 |
| 2005/0071328 A1* | 3/2005 | Lawrence | 707/3 |
| 2006/0036598 A1* | 2/2006 | Wu | 707/5 |
| 2006/0095430 A1* | 5/2006 | Zeng et al. | 707/7 |

FOREIGN PATENT DOCUMENTS

| | | | |
|---|---|---|---|
| EP | 1653380 A1 * | 5/2006 | |
| JP | 2006127529 A * | 5/2006 | |

OTHER PUBLICATIONS

"Citebase". Available online at http://www.citebase.org/abstract?identifier=oai%3AarXiv.org%3Acs%2F0606047&action=citeshits&citeshits=cites.*

Tao Liu; Zheng Chen; Benyu Zhang; Wei-ying Ma; Gongyi Wu, "Improving text classification using local latent semantic indexing," Data Mining, 2004. ICDM 2004. Proceedings. Fourth IEEE International Conference on , vol., No.pp. 162-169, Nov. 1-4, 2004 URL: http://ieeexplore.ieee.org/iel5/9681/30565/01410280.pdf?isnumber=30565&arnumber=1410280&ar.*

(Continued)

*Primary Examiner*—Neveen Abel Jalil
*Assistant Examiner*—Mark Andrew X Radtke
(74) *Attorney, Agent, or Firm*—Perkins Coie LLP

(57) ABSTRACT

A system for calculating the importance of web pages is provided. The web pages are organized hierarchically into collections. The system calculates the importance of each collection based on inter-collection links from a web page in one collection to a web page in another collection. The system then calculates the importance of web pages in the collections with a high calculated importance based on links between the web pages in those collections using, for example, a conventional page rank algorithm. The system may also calculate the importance of web pages in each collection with a low calculated importance separately based on the links between the web pages in the collection using, for example, a conventional page rank algorithm.

10 Claims, 8 Drawing Sheets

OTHER PUBLICATIONS

Chen, Z., Liu, S., Wenyin, L., Pu, G., and Ma, W. 2003. Building a web thesaurus from web link structure. In Proceedings of the 26th Annual international ACM SIGIR Conference on Research and Development in informaion Retrieval (Toronto, Canada, Jul. 28-Aug. 1, 2003). SIGIR '03. ACM Press, New York, NY, 48-55. DOI= http://doi.acm.org/10.1145/86.*

Xue, G., Zeng, H., Chen, Z., Ma, W., Zhang, H., and Lu, C. 2003. Implicit link analysis for small web search. In Proceedings of the 26th Annual international ACM SIGIR Conference on Research and Development in informaion Retrieval (Toronto, Canada, Jul. 28-Aug. 1, 2003). SIGIR '03. ACM Press, New York, NY, 56-63. DOI= http://doi.acm.org/10.114.*

Kamvar, Sepandar, D. et al., "Exploiting the Block Structure of the Web for Computing PageRank," Copyright 2003 (13 pages).

"The PageRank Citation Ranking: Bringing Order to the Web," Jan. 29, 1998 (17 pages).

Arasu, Arvind et al., "PageRank Computation and the Structure of the Web: Experiments and Algorithms," May 2002 (5 pages).

Faloutsos, Michalis et al., "On Power-Law Relationships of the Internet Topology," Aug. 1999 (12 pages).

* cited by examiner

… (US 7,774,340 B2)

METHOD AND SYSTEM FOR CALCULATING DOCUMENT IMPORTANCE USING DOCUMENT CLASSIFICATIONS

TECHNICAL FIELD

The described technology relates generally to calculating the importance of documents such as web pages.

BACKGROUND

Many search engine services, such as Google and Overture, provide for searching for information that is accessible via the Internet. These search engine services allow users to search for display pages, such as web pages, that may be of interest to users. After a user submits a search request that includes search terms, the search engine service identifies web pages that may be related to those search terms. To quickly identify related web pages, the search engine services may maintain a mapping of keywords to web pages. This mapping may be generated by "crawling" the web (i.e., the World Wide Web) to identify the keywords of each web page. To crawl the web, a search engine service may use a list of root web pages to identify all web pages that are accessible through those root web pages. The keywords of any particular web page can be identified using various well-known information retrieval techniques, such as identifying the words of a headline, the words supplied in the metadata of the web page, the words that are highlighted, and so on. The search engine service may generate a relevance score to indicate how relevant the information of the web page may be to the search request based on the closeness of each match, web page importance or popularity (e.g., Google's PageRank), and so on. The search engine service then displays to the user links to those web pages in an order that is based on their rankings.

Many different page rank algorithms have been used to calculate the importance or page rank of web pages. Many of these algorithms are variations of the PageRank algorithm proposed by S. Brin, L. Page, R Motwami, and T. Winograd in "The PageRank Citation Ranking: Bringing Order to the Web," Stanford University Technical Report, 1998. These algorithms calculate the importance of web pages based on links between web pages using the assumption that web pages typically include links to important web pages. Thus, a web page that is linked to by many web pages is likely to be an important web page. These algorithms represent the links between web pages using an adjacency matrix that indicates which web pages have links to which other web pages. The adjacency matrix A[i,j] is set to 1 when web page i has a link to web page j, and 0 otherwise. These algorithms are generally recursive and are variations of following:

$$PR_i = (1-w) + w \sum_j \frac{PR_j}{C_j} \quad (1)$$

where $PR_i$ is the page rank of web page i, web page j has a link to web page i, $C_j$ is the number of links on web page j, and w is a weight factor. To calculate the importance of a web page using these algorithms, the importance of every web page is simultaneously calculated. The computational complexity of these page rank algorithms is generally $O(n^2)$. As a result, it is very time-consuming to calculate importance when the corpus of web pages is very large. It would be desirable to have a page rank algorithm that would allow for more rapid calculation of importance while maintaining a similar ranking among the pages.

SUMMARY

A system for calculating the importance of nodes (e.g., web pages) having inter-node links is provided. The nodes are organized hierarchically into collections. The system calculates the importance of each collection based on inter-collection links from a node in one collection to a node in another collection. The system refines the collections with a high calculated importance into a more detailed collections and calculates the importance of the detailed collections based on the inter-collection links between the nodes in the detailed collections. If the collections cannot be refined, the system calculates the importance of nodes in the collections with a high calculated importance based on the inter-node links between the nodes in those collections using, for example, a conventional page rank algorithm. The system may also calculate the importance of nodes in each collection with a low calculated importance separately based on the inter-node links between the nodes in the collection using, for example, a conventional page rank algorithm. Since the system calculates importance for subsets of the nodes, rather than all the nodes simultaneously, the system is computationally more efficient than, for example, a conventional page rank algorithm.

DETAILED DESCRIPTION

Figure 1:
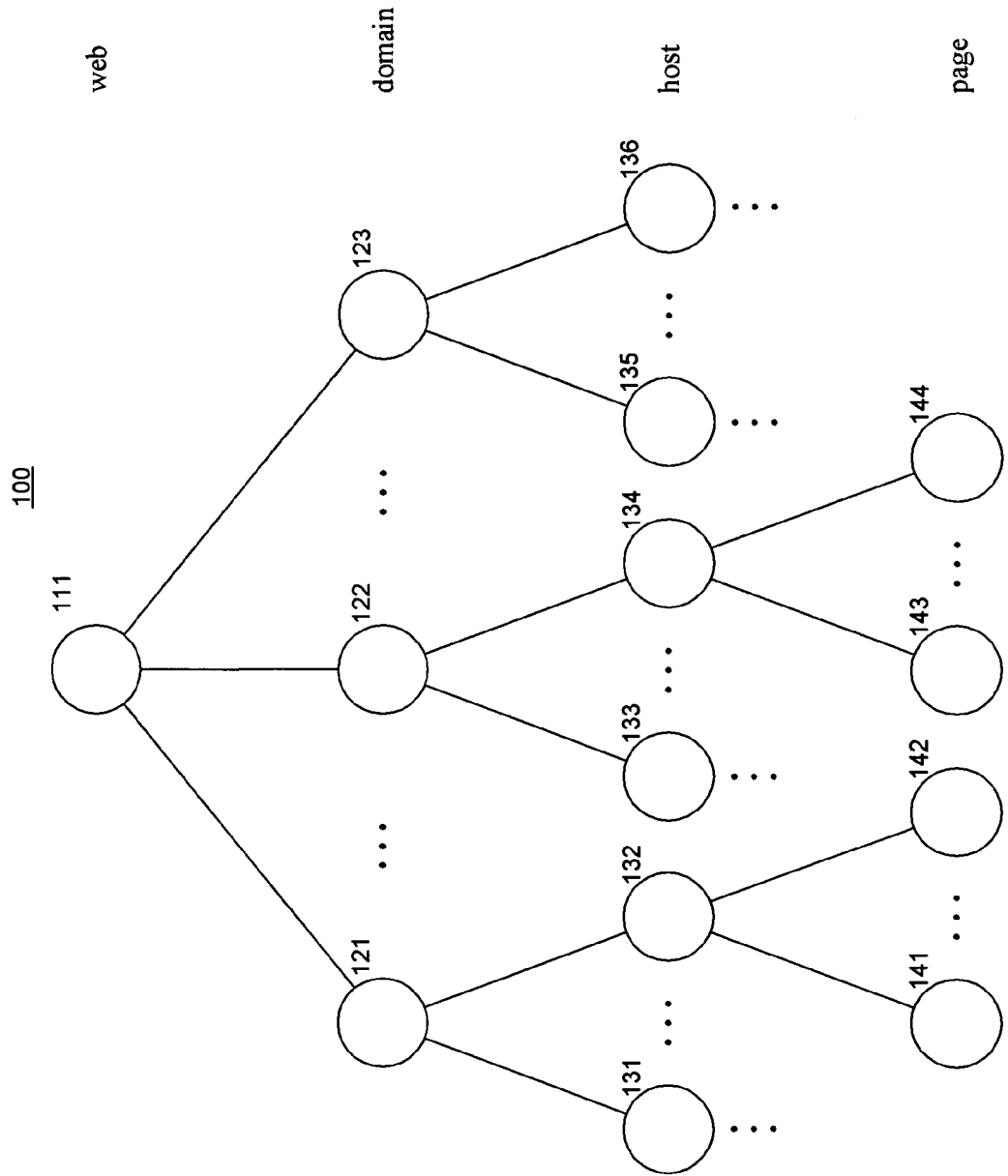
FIG. 1 illustrates a hierarchical classification of web pages in one embodiment.

A method and system for ranking documents based on classifications of documents within a corpus is provided. In one embodiment, a ranking system calculates the importance of documents based on inter-document links (e.g., citations within articles) and classifications of those documents into collections. For example, when the documents are web pages, the web pages may be classified by their domains. The ranking system initially calculates the importance of each collection of documents. The importance of a collection may be based on the number of inter-collection links between documents in different collections. In general, the importance of a collection, like the importance of a document, increases as the number of links to its documents from the documents of other collections increases. For example, the ranking system calculates the importance of each domain based on the inter-domain links of the web pages. The ranking system takes the documents of those collections with high importance and calculates the importance of the documents of those collections. The ranking system may use a conventional page rank algorithm when calculating the importance of those documents within the collections with high importance. For example, the ranking system may apply a page rank algorithm to all the web pages within the domains with a high importance. The importance of the documents within the collections with high importance is an approximation of the importance calculated using conventional page rank algorithms, which simultaneously calculate the importance for all documents. However, since the ranking system performs a page rank algorithm only on documents within collections with high importance, the importance of fewer documents is simultaneously calculated. Thus, the speed of the calculation is faster than if the algorithm was simultaneously performed on all documents including those within collections with low importance.

In one embodiment, the ranking system also calculates the importance for documents within collections with low importance. The ranking system may apply a conventional page rank algorithm to the documents within each collection individually to calculate a "local" importance for those documents. The ranking system uses only intra-collection links (e.g., links between web pages of the same domain) when calculating local importance. For example, the ranking system may apply a page rank algorithm to all the web pages of a domain with low importance. Since only the intra-collection links are used, the importance reflects the relative importance of the documents among themselves and is not influenced by documents in other collections. The ranking system then generates a global (or final) importance for each document by combining the local importance of the document with the importance of its collection. The global importance may be calculated by multiplying the local importance of a document by the importance of its collection and applying a weighting factor as appropriate. Thus, the global importance is an estimate of the importance of a document that would have been calculated if the page rank algorithm was simultaneously applied to the entire corpus of documents. The ranking system can then rank all the documents of the corpus based on their calculated importance irrespective of whether the documents are in collections with high importance or low importance. Because the ranking system simultaneously calculates the importance of smaller sets of documents, the importance can be calculated faster than if the importance of all the documents in the corpus was simultaneously calculated.

In one embodiment, the ranking system applies a page rank algorithm to the collections to calculate the importance of the collections. The ranking system establishes an adjacency matrix that indicates the inter-collection links of the documents. Each element of the adjacency matrix indicates the total number of links from the documents of one collection to documents within another collection. Thus, the collections for the purposes of the page rank algorithm may be considered pages themselves or more generally nodes as described below. For example, for each domain, the ranking system counts the number of links from the web pages of that domain to the web pages of each other domain and sets the elements of the adjacency matrix to that count.

In one embodiment, the documents may be organized into a hierarchy of classifications. For example, web pages may be organized into domains at the top level and the hosts within the domains at the next level. In such case, the ranking system initially calculates the importance of the domains. The ranking system then calculates the importance of the hosts within those domains with high importance. Finally, the ranking system calculates the importance of web pages among the hosts with high importance. The ranking system may also calculate global importance for web pages within the domains with low importance and global importance for web pages within the hosts with low importance. In this way, the ranking system calculates an importance for each web page that is an estimate of the importance calculated by conventional page rank algorithms.

One skilled in the art will appreciate that the setting of the cutoff between high importance and low importance can be adjusted to affect the number of web pages that are in the final importance calculation. If the cutoff is set to zero, meaning that all importances are high, then the effect will be that the importance is simultaneously calculated for all documents as is done using conventional algorithms. In contrast, if the cutoff is set to one, meaning that all importances are low, then the effect will be that importances are all estimated based on local importances factoring in the importance of collections.

FIG. 1 illustrates a hierarchical classification of web pages in one embodiment. Hierarchy 100 includes collections and web pages that are represented by nodes. Web 111, which is the root node, represents a collection of the entire corpus of web pages. Domains 121-123 represent the collections of web pages into domains. Hosts 131-136 represent the collections of web pages into hosts. Web pages 141-144, which are leaf nodes, represent the web pages themselves. Initially, the ranking system calculates the importance for each domain based on the inter-domain links of the web pages. In this example, the ranking system may give domains 121 and 122 a high importance and domain 123 a low importance. To calculate the importance of the web pages within domain 123, the ranking system may calculate the local importance of the web pages within domain 123 and then factor in the importance of domain 123 to generate a global importance for the web pages within domain 123. The ranking system then calculates the importance for hosts 131-134, which are the hosts within domains 121 and 122 with high importance. The ranking system may determine that hosts 132 and 134 have high importance and that hosts 131 and 133 have low importance. The ranking system then calculates the importance of web pages within hosts 131 and 133 by calculating the local importance of the web pages of each host separately. The ranking system then combines the local importance with the importance of its host to generate a global importance for each web page of hosts 131 and 133. The ranking system then applies a page rank algorithm to web pages 141-144 of the hosts with high importance to generate the importance of those web pages. The ranking system may then rank all the web pages based on their calculated importance. Because web pages 141-144 are in hosts with high importance, these web pages as a whole are likely to have a higher importance than web pages of domains or hosts with low importance. The ranking system takes advantage of the principle that the adjacency matrix of web pages is under a power distribution with the number of web pages with k links to it being proportional to $k^{-\beta}$.

Figure 2:
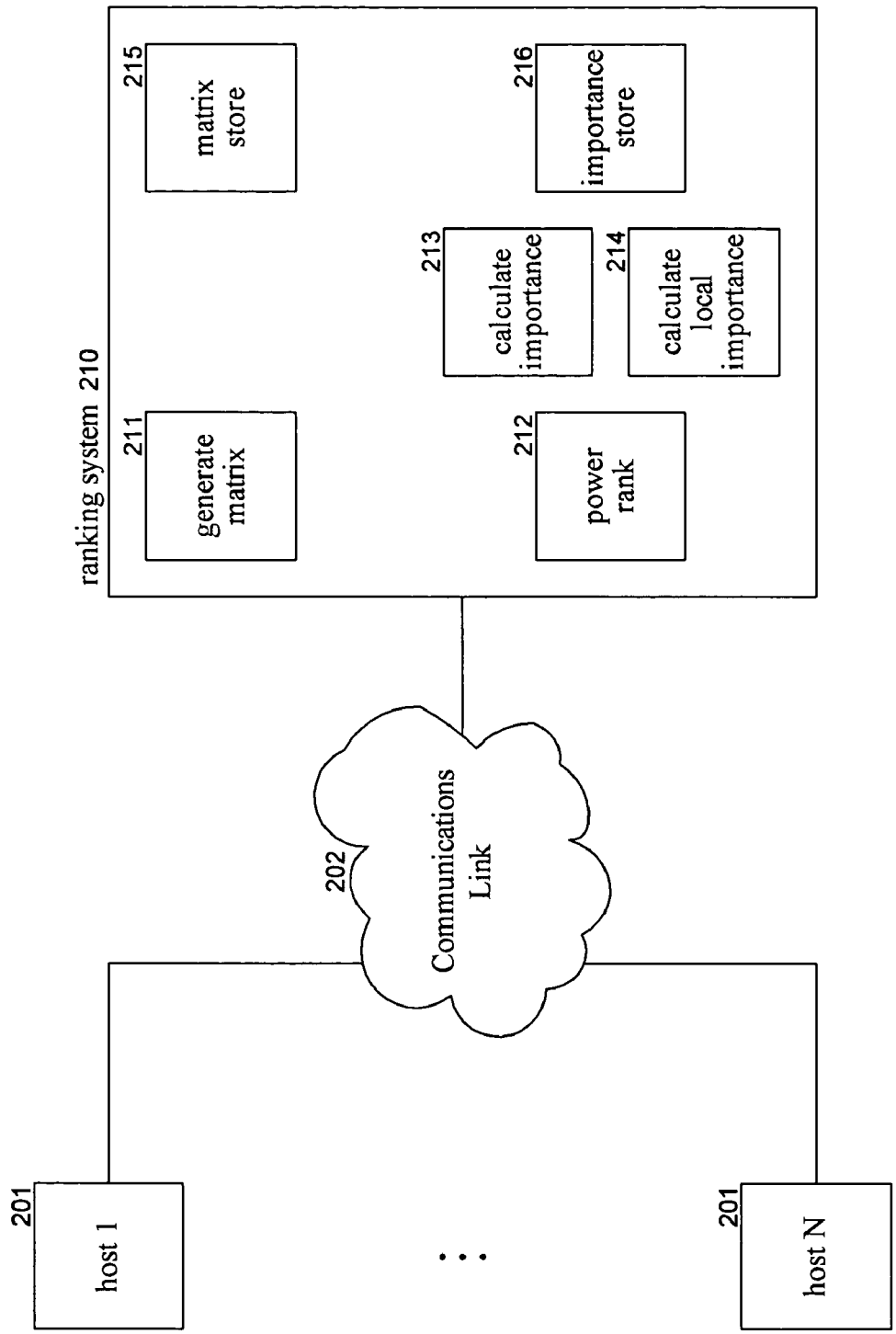
FIG. 2 is a block diagram illustrating components of the ranking system in one embodiment.

FIG. 2 is a block diagram illustrating components of the ranking system in one embodiment. The ranking system 210 may be connected to host computers 201 via a communications link 202. The ranking system may include a generate matrix component 211, a power rank component 212, a calculate importance component 213, and a calculate local importance component 214. The ranking system may also include a matrix store 215 and an importance store 216. The generate matrix component generates the adjacency matrices for the various collections of web pages within a hierarchical organization and stores the matrices in the matrix store. For example, the generate matrix component may generate an adjacency matrix for domains, an adjacency matrix for hosts, and an adjacency matrix for web pages. The power rank component calculates the importance of each web page within the corpus of web pages using the adjacency matrices. The power rank component invokes the calculate importance component to calculate the importance of the collections within each level of the hierarchy and of the web pages themselves. The power rank component invokes the calculate local importance component to calculate the local importance of web pages within collections with low importance. The power rank component stores the importances in the importance store. The power rank component, as its name implies, takes advantage of the power distribution of web pages.

The computing device on which the ranking system is implemented may include a central processing unit, memory, input devices (e.g., keyboard and pointing devices), output devices (e.g., display devices), and storage devices (e.g., disk drives). The memory and storage devices are computer-readable media that may contain instructions that implement the ranking system. In addition, the data structures and message structures may be stored or transmitted via a data transmission medium, such as a signal on a communications link. Various communications links may be used, such as the Internet, a local area network, a wide area network, or a point-to-point dial-up connection.

The ranking system may be implemented in various operating environments. The operating environment described herein is only one example of a suitable operating environment and is not intended to suggest any limitation as to the scope of use or functionality of the ranking system. Other well-known computing systems, environments, and configurations that may be suitable for use include personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The ranking system may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Figure 3:
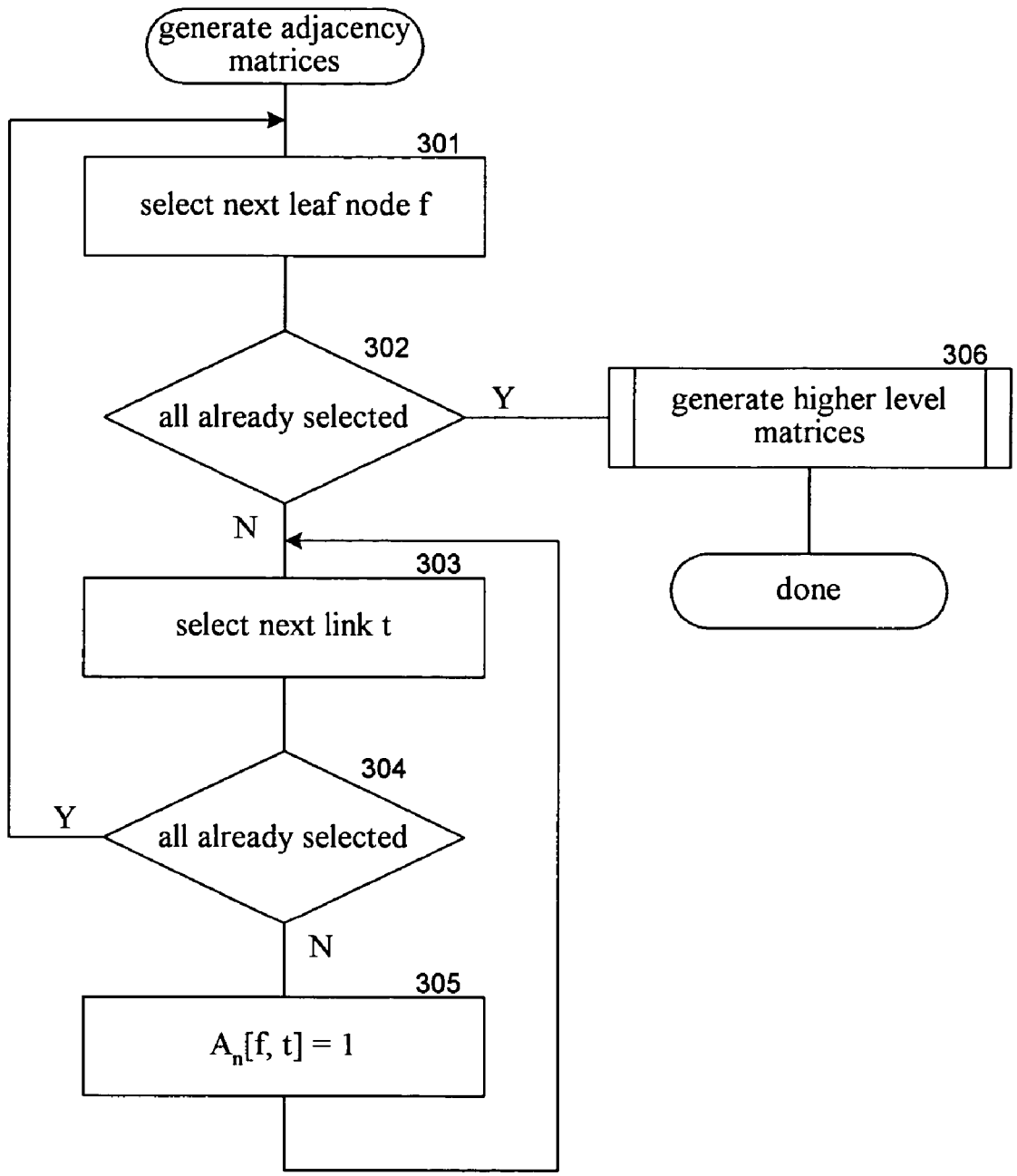
FIG. 3 is a flow diagram that illustrates the processing of the generate matrix component in one embodiment.

FIG. 3 is a flow diagram that illustrates the processing of the generate matrix component in one embodiment. The component loops selecting each of the web pages in the corpus and each link within each web page and initializes the adjacency matrix for the web pages. The component then generates higher-level matrices for the collections of web pages. Each level of the hierarchy has an adjacency matrix that indicates the number of links from each collection at that level to each other collection at that level. In block 301, the component selects the next web page (i.e., leaf node). In decision block 302, if all the web pages have already been selected, then the component continues at block 306, else the component continues at block 303. In block 303, the component selects the next link of the selected web page. In decision block 304, if all the links of the selected web page have already been selected, the component loops to block 301 to select the next web page, else the component continues at block 305. In block 305, the component stores a "one" in the adjacency matrix to indicate that there is a link from the selected web page to the target web page of the selected link. The component then loops to block 303 to select the next link of the selected web page. In block 306, the component invokes a component to generate the matrices for the collections and then completes.

Figure 4:
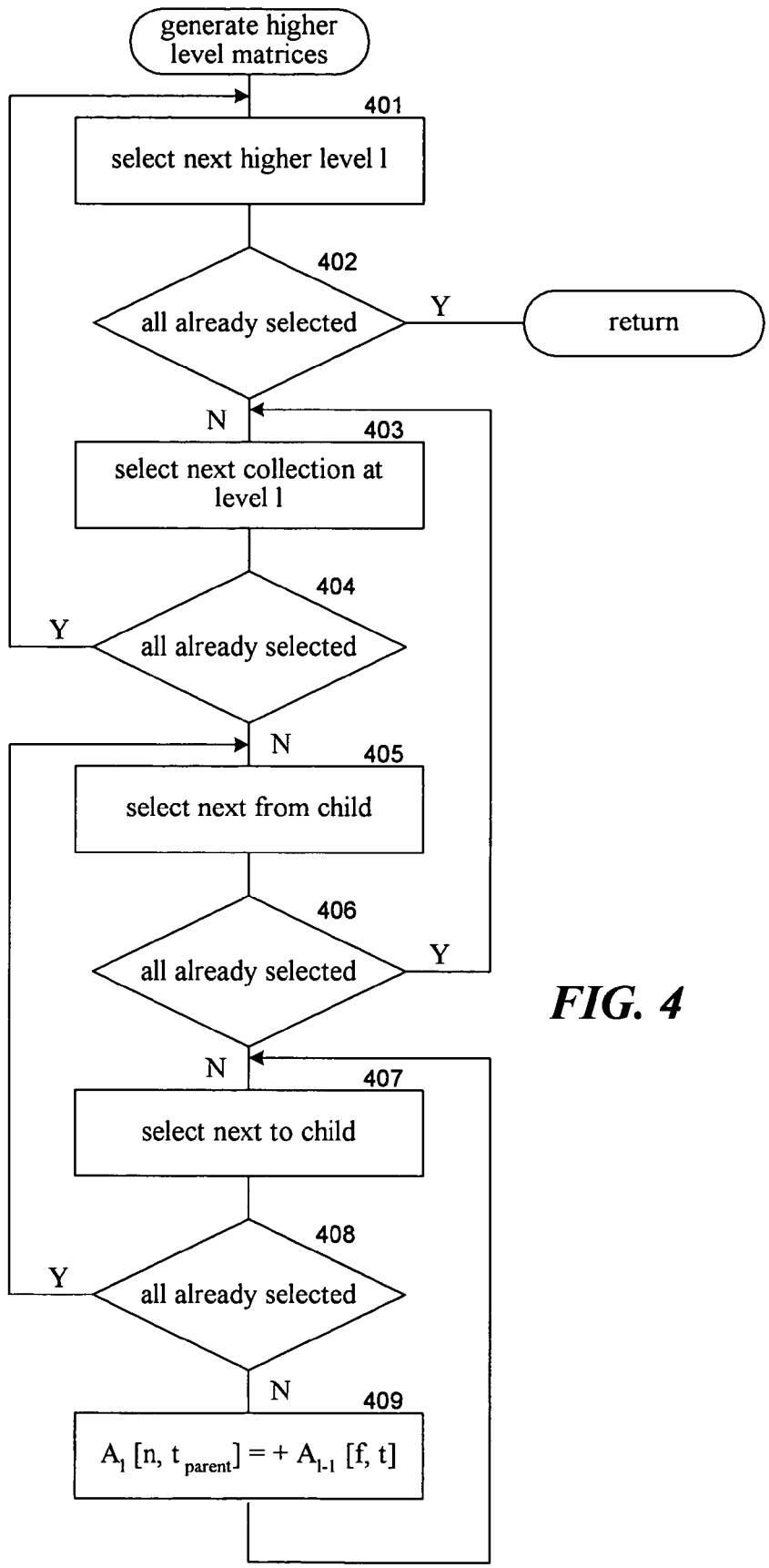
FIG. 4 is a flow diagram that illustrates the processing of the generate higher-level matrices component in one embodiment.

FIG. 4 is a flow diagram that illustrates the processing of a generate higher-level matrices component in one embodiment. The component generates the higher-level matrices by summing the links within the web pages of a collection that are to web pages in another collection. In block 401, the component selects the next higher level starting with the level above the web pages. In decision block 402, if all the levels have already been selected (i.e., at the root node of the hierarchy), then the component returns, else the component continues at block 403. In block 403, the component selects the next collection of the selected level as the from collection. In decision block 404, if all the collections have already been selected as from collections, the component loops to block 401 to select the next higher level, else the component continues at block 405. In block 405, the component selects the next from child (e.g., web page or collection) of the from collection. In decision block 406, if all the from children have already been selected, the component loops to block 403 to select the next collection of the selected level, else the component continues at block 407. In block 407, the component selects the next to child of another collection at the selected level that the from child points to (i.e., an inter-collection link). In decision block 408, if all the to children have already been selected, then the component loops to block 405 to select the next from child, else the component continues at block 409. In block 409, the component increments the element of the adjacency matrix for the selected level indexed by the from collection and the to collection (i.e., parent collection of the to child) by the element of the adjacency matrix of the next lower level indexed by the from child and to child. The component then loops to 407 to select the next to child.

Figure 5:
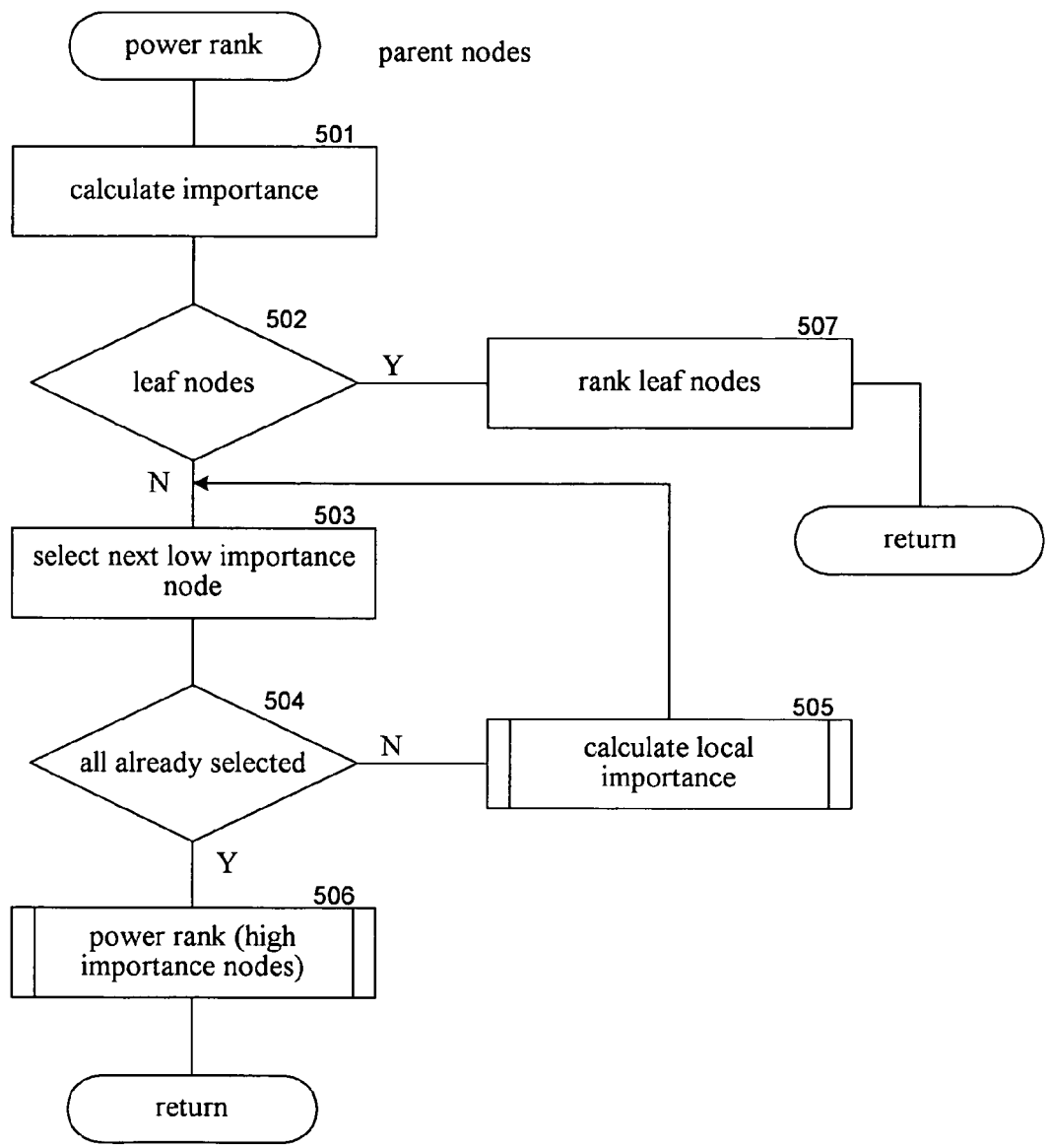
FIG. 5 is a flow diagram that illustrates the processing of the power rank component in one embodiment.

FIG. 5 is a flow diagram that illustrates the processing of the power rank component in one embodiment. The component is invoked initially passing the highest level node of the hierarchy. The component is invoked recursively passing parent nodes. The component generates an importance for each leaf node (e.g., web page) in the initially passed node. In block 501, the component calculates the importance for the child nodes of the passed parent node. In decision block 502, if the child nodes are leaf nodes, then the component continues at block 507, else the component continues at block 503. In blocks 503-505, the component loops calculating the local importance of each leaf node of a node with a low importance. In block 503, the component selects the next node with low importance. In decision block 504, if all the nodes with low importance have already been selected, then the component continues at block 506, else the component continues at block 505. In block 505, the component calculates the local importance of the leaf nodes within the selected node and then loops to block 503 to select the next node with low importance. In block 506, the component recursively invokes the power rank component passing the nodes with high importance. The component then returns. In block 507, the component ranks all the leaf nodes based on their importances and then returns.

Figure 6:
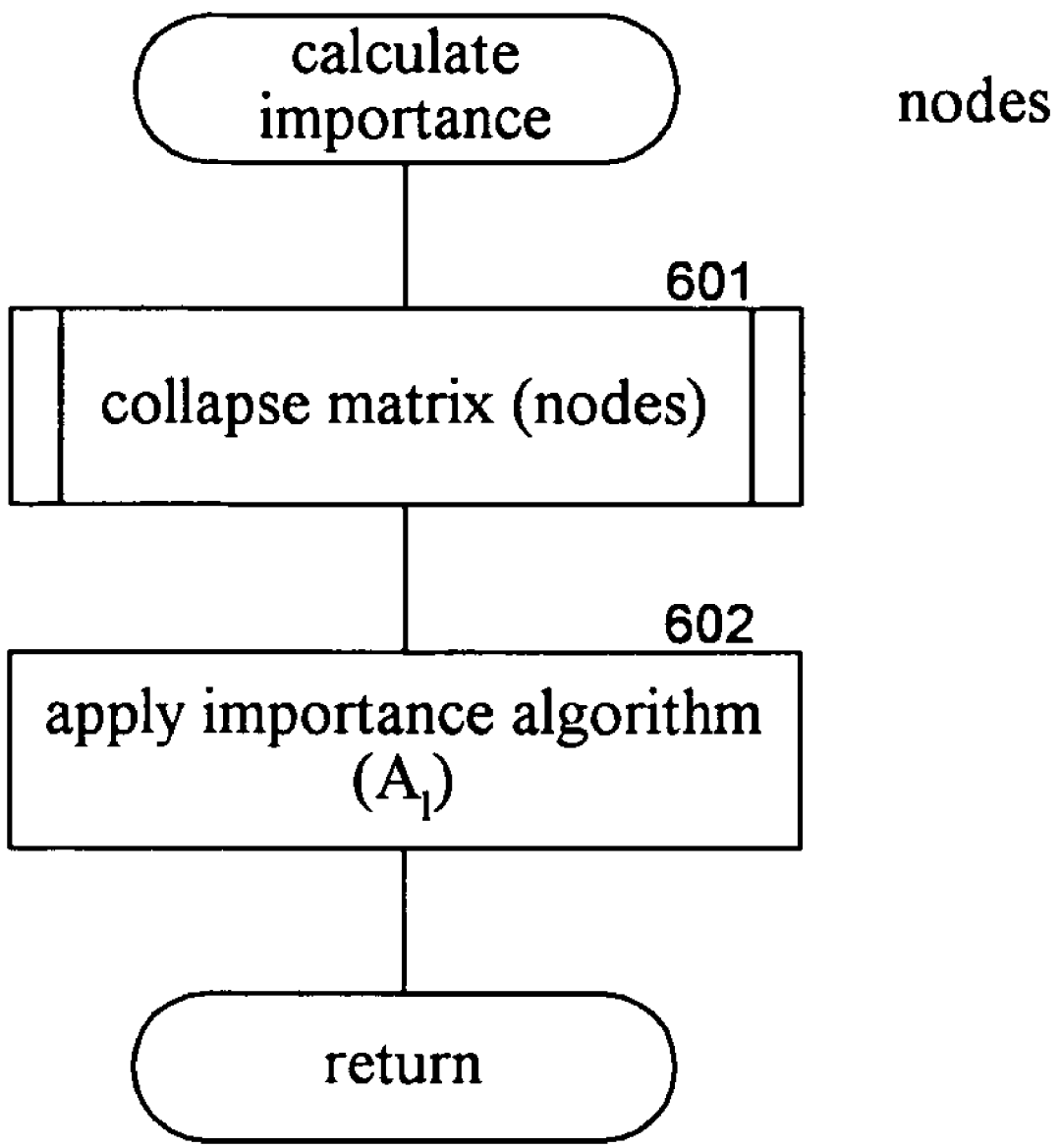
FIG. 6 is a flow diagram that illustrates the processing of the calculate importance component in one embodiment.

FIG. 6 is a flow diagram that illustrates the processing of the calculate importance component in one embodiment. The component is passed nodes at a level and applies a conventional page rank algorithm to the nodes to calculate their importance. In block 601, the component invokes a collapse matrix component to generate the adjacency matrix for only the passed nodes. In block 602, the component applies the page rank algorithm to generate the importance for the nodes and then returns. The page rank algorithm may assign an initial page rank value (e.g., 1) to each node and then iteratively solve Equation 1 for each node until the values converge on a solution.

Figure 7:
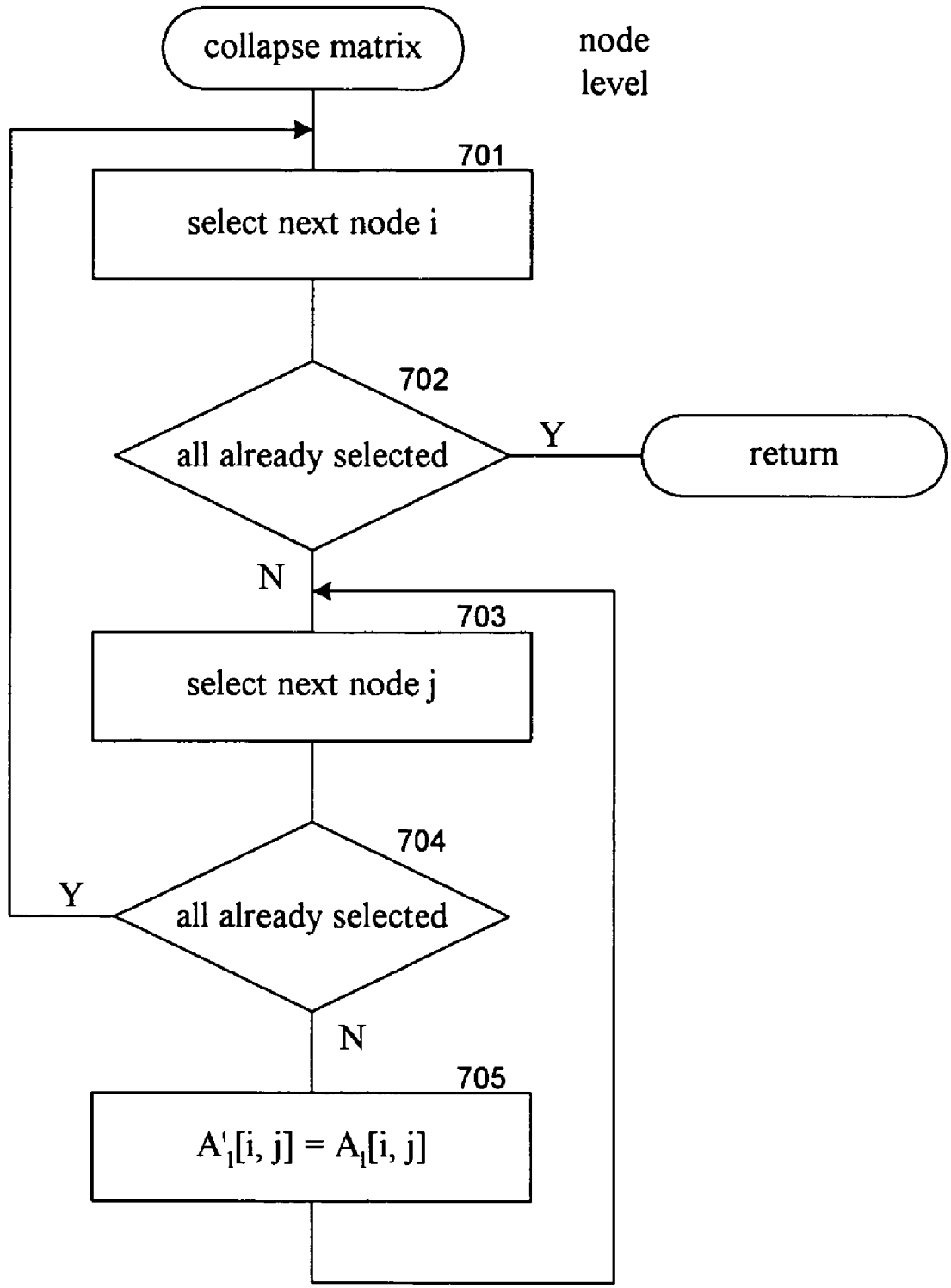
FIG. 7 is a flow diagram that illustrates the processing of the collapse matrix component in one embodiment.

FIG. 7 is a flow diagram that illustrates the processing of the collapse matrix component in one embodiment. The component is passed an indication of nodes within a level of the hierarchy and generates an adjacency matrix for only those nodes from the adjacency matrix for all the nodes at that level. The generated adjacency matrix is a subset of the original adjacency matrix for that level and has a row and a column for each passed node. In block 701, the component selects the next passed node as the first node of a pair. In decision block 702, if all the passed nodes have already been selected as first nodes, then the component returns, else the component continues at block 703. In block 703, the component selects the next passed node starting with the first as the second node of the pair. In decision block 704, if all the nodes have already been selected as second nodes for the selected first node, then the component loops to block 701 to select the next passed node as a first node, else the component continues at block 705. In block 705, the component sets the element of the collapsed matrix indexed by the first node and the second node to the element of the uncollapsed matrix indexed by the first node and second node. The component then loops to block 703 to select the next second node.

Figure 8:
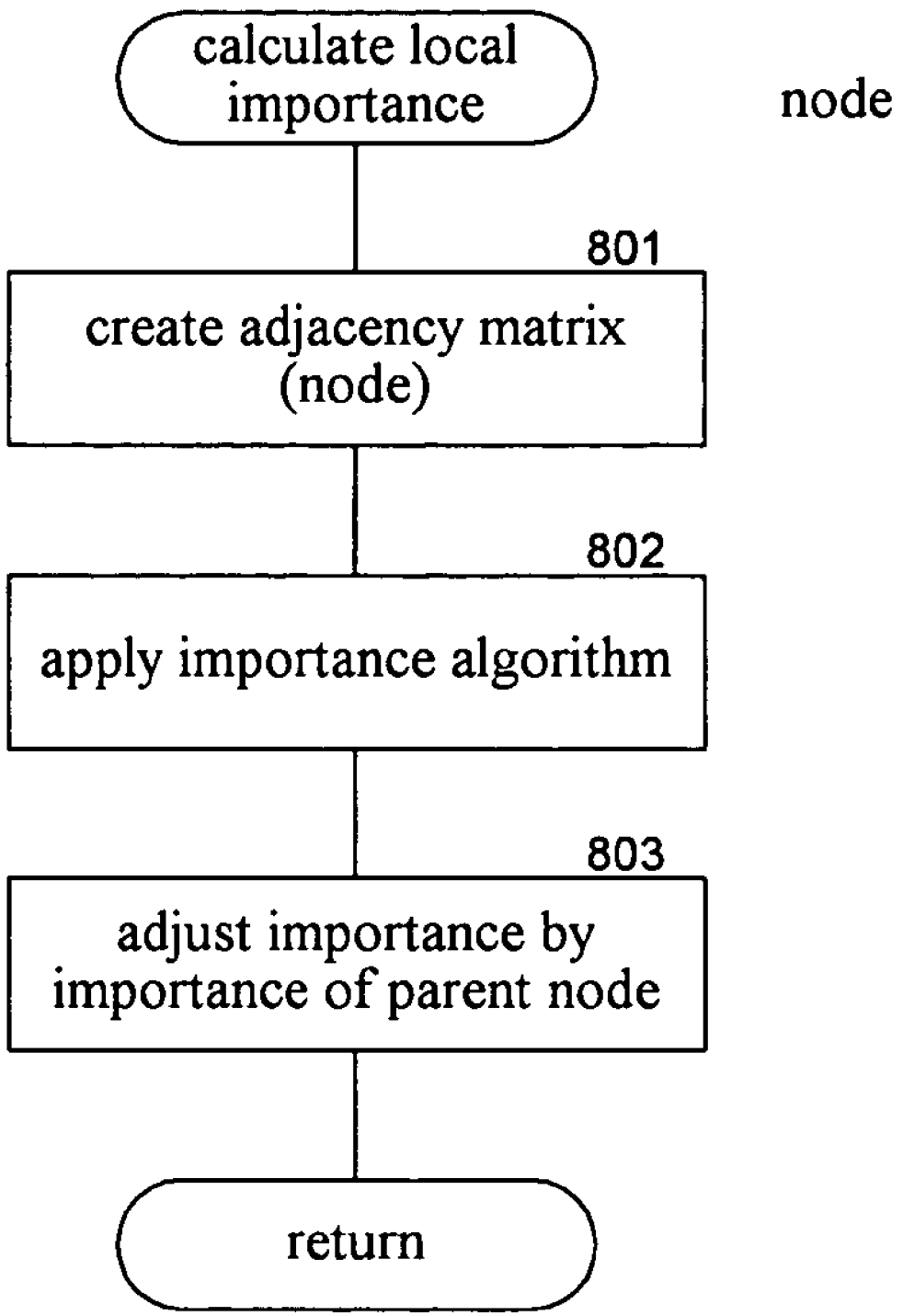
FIG. 8 is a flow diagram that illustrates the processing of the calculate local importance component in one embodiment.

FIG. 8 is a flow diagram that illustrates the processing of the calculate local importance component in one embodiment. The component is passed a node and calculates the local importance of the leaf nodes of the passed node. The component creates an adjacency matrix for the leaf nodes, applies a page rank algorithm to calculate the local importance, and adjusts the local importance by the importance of the passed node to calculate a global importance. In block 801, the component creates the adjacency matrix for the leaf nodes within the passed node. The adjacency matrix may be generated by collapsing the adjacency matrix for the leaf nodes. In block 802, the component applies the page rank algorithm using the created adjacency matrix. In block 803, the component adjusts the local importance by the importance of the passed node to generate a global importance for each leaf node. For example, the global importance of a leaf node may be set to the local importance weighted by the importance of the passed node or any of the ancestor nodes of the passed node. The component then returns.

One skilled in the art will appreciate that although specific embodiments of the ranking system have been described herein for purposes of illustration, various modifications may be made without deviating from the spirit and scope of the invention. One skilled in the art will appreciate that the ranking system may be used to calculate the importance of anything that can be linked and is not limited to traditional documents. For example, images can be considered nodes and the links can represent relationships to other images. As another example, the nodes can be people or organizations and the links can represent interpersonal or inter-organizational relationships. Thus, the term "node" refers to a representation of anything that can have a relationship, such as a person, an image, a piece of information, an organization, and so on. One skilled in the art will appreciate that the links can represent bibliographic information, citations, references, hyperlinks, and so on. One skilled in the art will also appreciate that many different organizations of nodes can be used. For example, web pages can classified by their highest level domains (e.g., ".com," ".edu," and ".gov"), by subject matter (e.g., sports, religious, political, and commercial), by applying a clustering technique, and so on. As another example, people can be classified based on occupation, education, citizenship, and so on. One skilled in the art will appreciate that many different page rank algorithms or other importance algorithms may be used by the ranking system to calculate the importance of nodes. The algorithms generate a score indicating the importance of a node. Accordingly, the invention is not limited except by the appended claims.

We claim:

1. A method in a computer system with a processor and a memory for calculating importance of documents, the documents having inter-document links, the method comprising:

providing an organization of the documents into collections, each collection including a plurality of documents;

for each collection, identifying inter-collection links of the documents within the collection, an inter-collection link being a link between a document in one collection and a document in another collection;

calculating by the processor importance of each collection by applying a page ranking algorithm to the collections wherein the page ranking algorithm operates on nodes and links, each collection represented by a node and the inter-collection links represented by links between the nodes, to calculate importance for each collection of documents based on the inter-collection links from a document in one collection to a document in another collection;

dividing by the processor the collections into a high importance set of collections and a low importance set of collections, wherein the collections of the high importance set of collections have a calculated importance that is above the calculated importance of the collections in the low importance set of collections;

after dividing the collection into the high importance set of collections and the low importance set of collections, calculating by the processor importance of the documents in the high importance set of collections by applying a page ranking algorithm to the documents in the high importance set of collections wherein each document is represented by a node and the inter-document links between documents within the high importance set of collections are represented by links between the nodes to calculate the importance of each document in the high importance set of collections based on the inter-document links between the documents of the high importance set of collections wherein the documents of the low importance set of collections are not factored into calculating importance of the documents of the high importance set of collections; and calculating importance of the documents in the low importance set of collections by applying a ranking algorithm to the documents in the low importance set of collections to calculate the importance of each document in the low importance set of collections by, for each collection of the low importance set of collections, calculating a local importance of each document in the collection of the low importance set of collections by applying a page ranking algorithm to the documents in the collection wherein each document in the collection is represented by a node and the intra-collection links between documents of the collection are represented by links between the nodes; and for each document in the collection of the low importance set of collections, calculating a combined importance for that document based on the calculated importance of the collection and the calculated local importance of the document; and presenting a combined ranking of the documents in the collections based on the calculated importance of the documents of the high importance set of collections and the calculated importance of the documents of the low importance set of collections.

2. The method of claim 1 wherein the documents are web pages and are hierarchically organized based on domains of the web pages.

3. The method of claim 1 wherein the documents are web pages that are organized by hosts and the hosts are organized by domains and wherein the applying of a page ranking algorithm to the collections includes calculating importance for the domain collections, selecting domain collections with high importance, and calculating importance of host collections in the selected domain collections.

4. The method of claim 1 wherein the applying of a page ranking algorithm to the collections includes generating an adjacency matrix for the collections with an indication of inter-collection links between each pair of collections.

5. The method of claim 1 wherein the applying of a page ranking algorithm to the documents of the high importance set of collections includes generating an adjacency matrix for the documents with an indication of inter-document links between each pair of the documents.

6. A computer system for calculating the importance of documents that are organized into collections, comprising:
　a memory storing computer-executable instructions of:
　　a component that calculates importance for each collection of documents by applying a page ranking algorithm to the collections, the page ranking algorithm operating on nodes and links, wherein each collection is represented by a node and inter-collection links are represented by links between the nodes, an inter-collection link being an inter-document link between a document in one collection and a document in another collection;
　　a component that divides the collections into a high importance set of collections and a low importance set of collections, wherein the collections of the high importance set of collections have a calculated importance that is above the calculated importance of the collections in the low importance set of collections;
　　a component that calculates importance of the documents of the high importance set of collections by applying a page ranking algorithm, wherein the documents are represented by nodes and the inter-document links between the documents of the high importance set of collections are represented by links between the nodes, wherein the documents of the low importance set of collections are not factored into the calculating of the importance of the documents of the high importance set of collections;
　　a component that calculates importance of the documents in the low importance set of collections by applying a ranking algorithm to the documents in the low importance set of collections to calculate the importance of each document in the low importance set of collections by, for each collection in the low importance set of collections,
　　　calculating a local importance of each document in the collection by applying a page ranking algorithm to the documents in the collection wherein each document in the collection is represented by a node and the intra-collection links between documents of the collection are represented by links between the nodes; and
　　　for each document in the collection, calculating a combined importance for that document based on the calculated importance of the collection and the calculated local importance of the document; and
　　a component that outputs an indication of the ranking of the documents of the collections based on the calculated importance of the documents of the high importance set of collections and the combined importance of the documents in the low importance set of collections; and
　a processor for executing the computer-executable instructions stored in the memory.

7. The computer system of claim 6 wherein the documents are web pages that are hierarchically organized based on domains of the web pages.

8. The computer system of claim 6 wherein the documents are web pages that are organized by hosts and the hosts are organized by domains and wherein the component that calculates importance for each collection of documents includes calculating importance for the domain collections, selecting domain collections with high importance, and calculating importance of host collections in the selected domain collections.

9. The computer system of claim 6 wherein the component that calculates the importance for each collection generates an adjacency matrix for the collections with an indication of inter-collection links between each pair of collections.

10. The computer system of claim 6 wherein the component that calculates the importance for the documents generates an adjacency matrix for the documents with an indication of inter-document links between each pair of the documents.

\* \* \* \* \*